(12) United States Patent
Alvarado

(10) Patent No.: US 6,532,695 B1  
(45) Date of Patent: Mar. 18, 2003

(54) MULTIPLE BAIT STRUCTURE INSECT TRAP

(76) Inventor: Richard Alvarado, 5314 E. Butler Ave., Fresno, CA (US) 93727

( * ) Notice: Subject to any disclaimer, the term of this patent is extended or adjusted under 35 U.S.C. 154(b) by 0 days.

(21) Appl. No.: 09/548,567

(22) Filed: Apr. 13, 2000

(51) Int. Cl.$^7$ ................................................ A01M 1/10
(52) U.S. Cl. .......................................... 43/122; 43/107
(58) Field of Search ...................... 43/107, 122, 132.1; 403/349

(56) References Cited

U.S. PATENT DOCUMENTS

| | | | | |
|---|---|---|---|---|
| 1,219,665 A | * | 3/1917 | Rozwud | 43/122 |
| 1,297,894 A | * | 3/1919 | Navrot | 43/122 |
| 1,882,380 A | * | 10/1932 | Braun | 43/107 |
| 1,919,916 A | * | 7/1933 | Taylor | 43/107 |
| 2,444,758 A | * | 7/1948 | Stillbach | 403/349 |
| 3,820,273 A | * | 6/1974 | Novak | 43/122 |
| 3,885,341 A | * | 5/1975 | Kuchenbecker et al. | 43/121 |
| 4,030,233 A | * | 6/1977 | Wunsche | 43/121 |
| 4,501,088 A | * | 2/1985 | Boisvert et al. | 43/118 |
| 4,518,162 A | * | 5/1985 | Oates | 403/349 |
| 4,642,936 A | * | 2/1987 | Jobin et al. | 43/122 |
| 4,873,787 A | * | 10/1989 | Schneidmiller | 43/122 |
| 5,231,792 A | * | 8/1993 | Warner | 43/122 |
| 5,392,558 A | * | 2/1995 | Blomquist | 43/107 |
| 5,596,833 A | * | 1/1997 | Harrie et al. | 43/122 |
| 6,018,905 A | * | 2/2000 | Lingren | 43/107 |

FOREIGN PATENT DOCUMENTS

| | | | | |
|---|---|---|---|---|
| FR | 498369 B1 | * | 1/1920 | 43/122 |
| GB | 21209 B1 | * | 9/1911 | 43/122 |
| GB | 2052942 A1 | * | 2/1981 | 43/122 |
| JP | 9-252700 B1 | * | 9/1997 | |

* cited by examiner

*Primary Examiner*—Darren W. Ark  
(74) *Attorney, Agent, or Firm*—Kenneth J. Hovet

(57) ABSTRACT

The insect trap has a top and bottom that, when connected, form a chamber for luring and containing insects. The main entry for insects is located on the bottom of the insect trap. The insect trap has a plurality of lure support structures that will accommodate many different varieties of lure, to include projections for holding card lures, an annulus for holding a cylinder or vial, either of which contain lure, and a chamber with an adjustable plug that may hold lure or may be used as a vent to control air flow, or may serve as a second access for insect entry. The insect trap has an overall cylindrical shape, with side walls that will easily accommodate an adherent type lure. The flat sides of the insect trap enable a user to more easily examine the contents of the trap without disturbing or directly contacting the contents. The insect trap has a set of legs and a device for suspension, allowing the insect trap to be used either hanging or on a surface. The insect trap may be used to confine insects for pest control, or to sample insect populations.

5 Claims, 3 Drawing Sheets

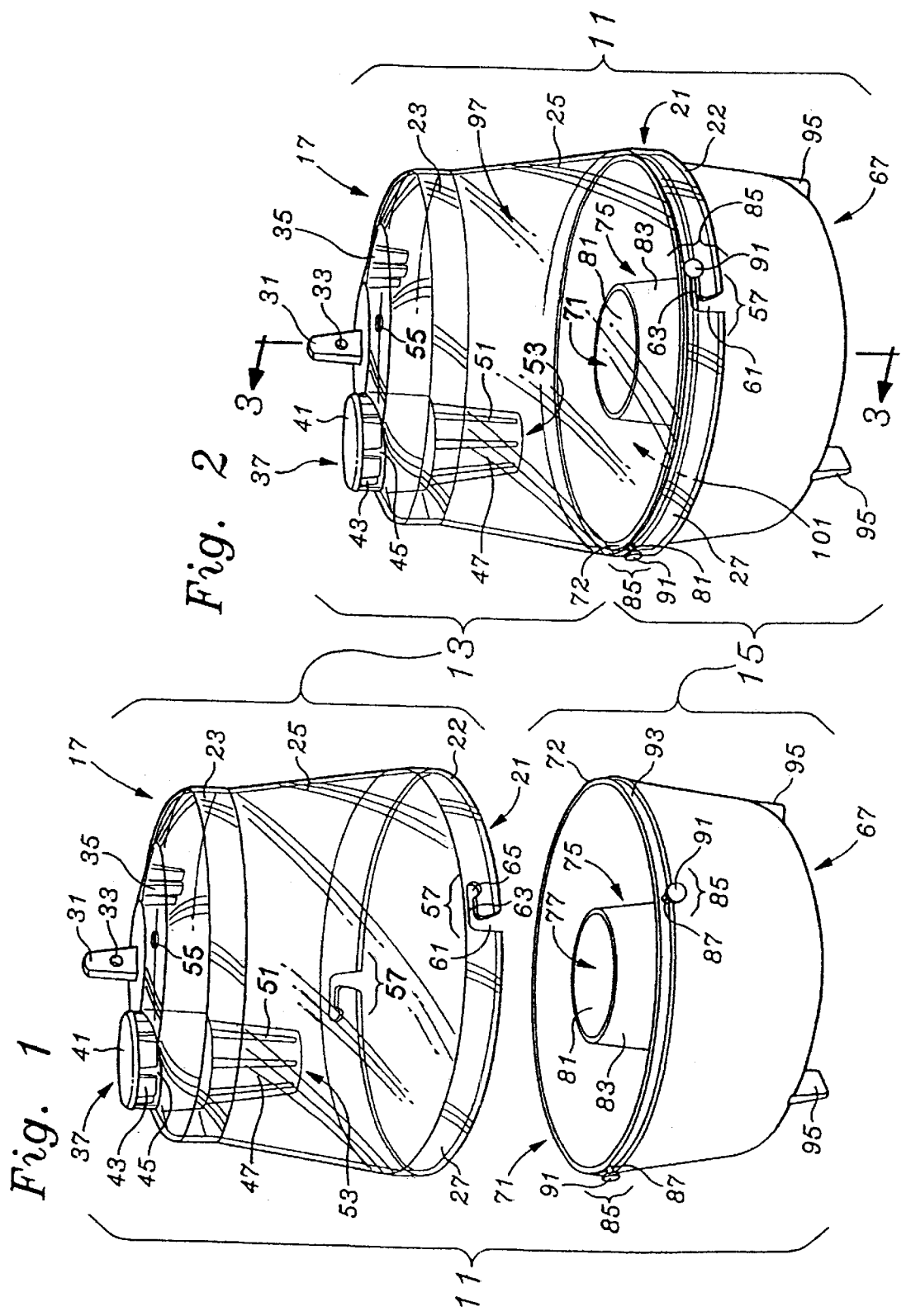

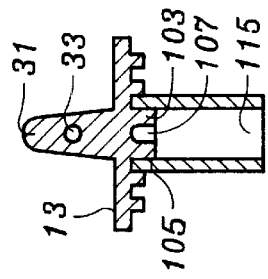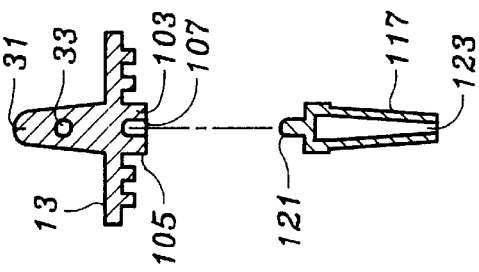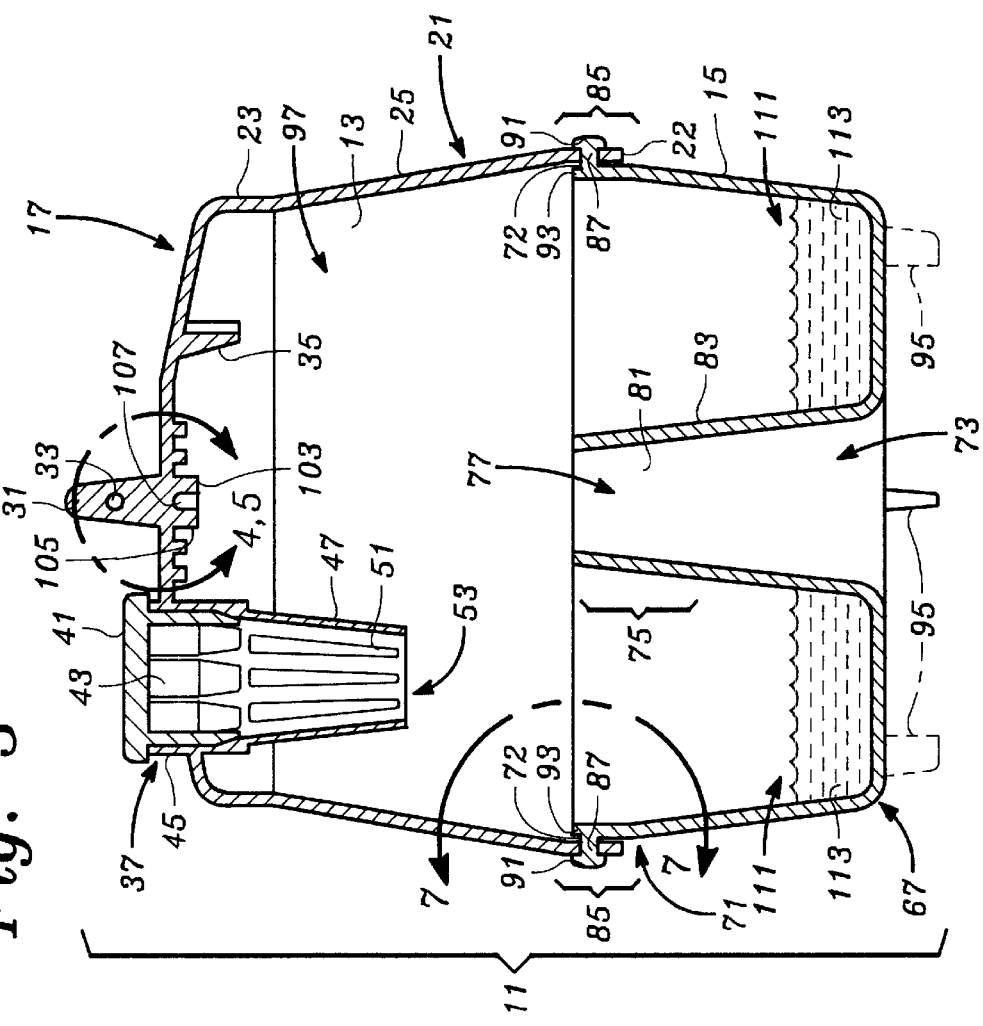

MULTIPLE BAIT STRUCTURE INSECT TRAP

FIELD OF THE INVENTION

The present invention relates to a single structure environment for multiple lure structures to enable consistent sampling and more precise data collection; multiple selection and utilization of baits for sampling; multiple trap installations and support; and elimination of the need for multiple trap structures each having different capabilities.

BACKGROUND OF THE INVENTION

For the purpose of using and sampling the effectiveness of lure products, insect populations, and trap environments, or to reduce the insect population, there is currently a need to use a variety of trap types which are conventionally available in order to take utilize different lure structure support capabilities as dictated by the physical shapes often dictated by the types of lure structures upon which different types of lure chemicals are supported. The term "lure" generally relates to a chemical agent or attractant and may exist in a pure state or with some other agent. Other agents may include killing agents where the lure structure also provides a killing mechanism for the insects or bonding agents with which the lure may be affixed to a structure to which it is attached. Killing can occur by adhesion, poison or other disabling mechanism.

Most available single traps will accommodate only one or two kinds of lure structures, and allow a maximum of two lure structures to be simultaneously employed. Lures are typically not always available in a variety of structures, the structure being often dictated by the characteristics of material transport or simply by the manufacturer's fiat. Because most conventional traps do not invite the use of more than one lure structure at a time, nor provide support for the majority of lure support structures available, the ability to utilize many different lures and lure structures both for investigating lure effectiveness and insect sampling could prove quite costly. The difference in lure support structures can be due to the makeup of the lure itself. Not all compositions are amenable to being supported from a card, for example. Some compositions must of necessity exist as a liquid and their liquid nature may be vital to the material transport of the lure attractant. Since each different type of lure structure would require the purchase of a trap which would accommodate its corresponding shape, size and support requirements. Conventional designs that disallow the use of simultaneous lures will, as a result, require a user to purchase and keep a larger number of traps each type of which facilitates utilizing a single type of lure, especially where several lures are generally never available in a single structure. For a user who required a large number of traps to cover a significant area, the cost of purchasing many different kinds of traps in order to utilize different types of lure structures could be prohibitively expensive and storage prohibitively burdensome. For example, a user requiring only 100 traps to cover a given area would be required to purchase 300 traps in order to utilize three different kinds of lure structure, three times the number that would normally be necessary.

Furthermore, studies conducted to investigate lure efficacy and that utilize conventional traps of various configurations would likely yield unreliable results. For example, if lure A were placed in a triangular paper trap and lure B were placed in a cylindrical plastic trap, it would be difficult, if not impossible to determine whether a discrepancy in the level of insect attraction and capture was due to trap shape and characteristics, or difference in lure composition between the two traps.

It is also obvious that the expense associated with performing a survey using two lures within a given area requires using multiple traps within a same area in order to support two lure structures, each having different structure requiring a different trap. Conventional traps then prevent a user from gaining the savings of the multiple of less types of traps, as well as with the common mixing and diffusion effect of placing the lures and lure structures in a very close proximity at the locations where atmospheric diffusion of the attractant begins. In addition, where the attractant and capturing structure are provided in a single package, the conventional traps available on the market would still not enable a user to test the effects of using such lures in the presence of each other, and to measure the competitive attraction and killing efficacy simultaneously. For example, if lure A was known to attract insect A successfully, and lure B was known to attract insect B successfully, the combination of lure A with lure B might well be observed to attract not only insects A and B, but insect C as well. Such experimentation by a user would not be possible using conventional traps. On the other hand if combination lure and killing structures A and B were provided simultaneously, and more insects attached themselves to structure A than B, it may result in a finding that A is more attractive than B at higher concentrations, such as may be found within an enclosed trap.

In regard to trap placement, conventional traps may be suspended, or may be placed on a flat surface, but are not usually configured such that either method of use may be implemented as the available structure warrants. Some traps have a flat bottom and must therefore be used as hanging traps, since they have no route for insects to enter if the trap placed on a flat surface, or with a special support which allows access to the bottom entrance. Similarly, most traps designed for surface use have no means by which they may be suspended. Although a surface type trap could certainly be modified in order to facilitate suspension, the process would require considerable time and energy, especially as effort multiplied for a large number of traps, and the modified traps may not necessarily continue to function as expected. The placement limitations of either of the conventionally available traps may also interfere with attraction of certain insects, or may lead to erroneous results in studies conducted to test the efficacy of a trap or to sample certain insect populations or certain lure attractants. For this reason, neither of the conventional options for traps makes an optimal sampling instrument.

Another important disadvantage of most traps is that they are not ventilated. In addition to not being ventilated, conventional traps may have connecting parts that fit together very snugly, further decreasing air circulation within the trap. This may prove problematic in extremely hot and humid conditions, as the trapped heat and moisture may cause damage to the lures that may render them ineffective. More importantly, where a liquid lure or exterminator were used in the reservoir of the trap, any significant amount of heating might create a vapor-heat barrier at the opening in the trap. Because there is only one opening for insect egress in conventional traps, such a barrier would very likely prove to be a deterrent to insects that might otherwise enter the trap. This is another potential problem in conducting studies that analyze the usefulness of the different types of traps and lures.

Finally, most conventional traps are designed such that they are not amenable to the utilization of an adherent type lure structure that is best affixed to a relatively flat surface. This is yet another feature of conventional traps that hinders the use of different lure structures in tandem for the object of targeting heightened performance of the trap or lures. Many traditional traps may also obscure viewing of the trap contents, making it fairly difficult to accurately analyze the results especially spot checks during the middle of the progression of a sampling without first opening or actually emptying the trap. Having to interrupt a sampling period by removing a trap for inspection introduces a further source of error both for the time the trap is missing and by tampering with the trap.

SUMMARY OF THE INVENTION

The insect trap of the present invention employs a variety of synergistic features which constitute a superior trap. The insect trap allows for use of multiple types of lures and their associated lure structures either individually or in tandem in order to optimize insect attraction. Because the present invention allows great versatility in selecting and utilizing various lures, it makes a desirable, economical, and efficient tool for conducting studies to test lure effectiveness, to capture insects for pest control, or to sample insect populations.

The insect trap of the present invention has a top housing member and bottom housing member that, when connected together, form a chamber into which insects are lured and contained. The insect trap of the present has multiple features that make it possible to utilize any one of a variety of lure and their lure structures, as well as a combination of multiple lure structures simultaneously. A series of offset tabs extending from the lid are provided for holding a card type lure structure. Additionally, the lid has a plurality of projections that will accommodate other types of lure structures that may hold a variety of different kinds of lure, including solid, liquid, gelatinous, or granular. The first of these projections will support either a vial type lure structure, suspendable by use of a rubber nipple, or a permeable lure container, connectable directly to the projection itself.

The insect trap of the present invention also has an adjustable plugged vent in the lid, including a slotted basket structure that extends into the chamber of the insect trap. When the plug is removed from the vent opening, the slotted basket provides yet another method by which a lure structure may be suspended. Finally, the insect trap of the present invention has an overall cylindrical shape, with side walls that will easily accommodate an adherent type lure structure or lure card. The flat sides of the trap also enable a user to more easily examine the contents of the trap so that direct contact with lures, exterminator materials, or captured insects is minimized, and so that the contents may be easily and cleanly disposed of once viewing is completed. If multiple lures are utilized, the ability to inspect the undisturbed contents of the proposed insect trap will serve as an aide in assessing not only the type of insect captured by each of the lures, but also which of the lures may be more effective given a specific type of insect.

The base of the insect trap of the present invention has an opening that allows insects to enter, and also forms a reservoir that allows a user to employ either an attractive or an exterminator material in most any form that requires an open container. Note that the material contained in the reservoir of the insect trap may also exist in conjunction with any of the aforementioned lure structures attachable to the lid of the insect trap. In combination with the vented lid, the opening in the base allows for air flow through the chamber of the insect trap. The vent plug is manually adjustable within the basket structure so that the amount of air flowing through the trap may be easily controlled. In the event of hot or humid conditions, the air flow afforded by the vent of the proposed insect trap would allow any vapors from the contained lures to escape, lessening the chance that insect attraction would be adversely affected by a heat or vapor barrier at the entry. Another advantage to a well ventilated insect trap is that a cooler environment is created by allowing air to flow through the chamber of the insect trap. Insects are more likely to enter into a well-ventilated chamber than into a chamber that may be overheated or may have unusually high humidity. The top of the insect trap of the present invention has a series of locking slots, interlockably engageable with a corresponding series of projections located on the base. The top and base together are designed to form a third opening for the promotion of air flow through the chamber of the insect trap. A final advantage to a well ventilated insect trap is that any excess heat that may cause vaporization of the lure will help to distribute the lure vapors through the vent and into the atmosphere outside of the trap, potentially attracting more insects than would have been possible than without venting.

Removal of the plug from the vent of the insect trap of the present invention will also provide another entry access for insects, potentially increasing the number of insects caught by the trap. Because the vent basket is elongate and frustoconical, an insect advancing any appreciable distance into the basket would have no significant probability to escape along the same path from which it entered.

Another important feature of the insect trap of the present invention is a set of legs on the bottom that, in combination with a hanger located on the top, allows the trap to be used either as a hanging trap or a surface trap. The legs allow continuous access to the main entry through the opening in the base even when the trap is resting on a surface. Because the insect trap of the present invention may be used in either hanging or resting capacity, the need for purchasing many different kinds of traps in order to target certain insect populations is eliminated. Subsequently, the insect trap of the present invention is both an effective and economical tool.

BRIEF DESCRIPTION OF THE DRAWINGS

The invention, its configuration, construction, and operation will be best further described in the following detailed description, taken in conjunction with the accompanying drawings in which:

FIG. 1 is an exploded view of the insect trap of the present invention and illustrates the first member as separate from the second member and illustrating the vent structure, plug, lug, and lure support structures;

FIG. 2 is a view of the insect trap as seen in an assembled condition;

FIG. 3 is a cross-sectional view along line 3—3 of FIG. 2 and illustrates the reservoir present in the second member, the vent and plug, hanging apparatus, and supported lure structure;

FIG. 4 is an enlarged view of the section of the insect trap of the present invention defined by line 4, 5 of FIG. 3, and illustrates a lug and an annular projection, and a first type of lure structure attached to the annular projection;

FIG. 5 is an enlarged view of the section of the insect trap of the present invention defined by line 4,5 of FIG. 3, and illustrates a lug and an annular projection as a second type of lure structure as attached to the annular projection;

DETAILED DESCRIPTION OF THE PREFERRED EMBODIMENT

Figure 7:
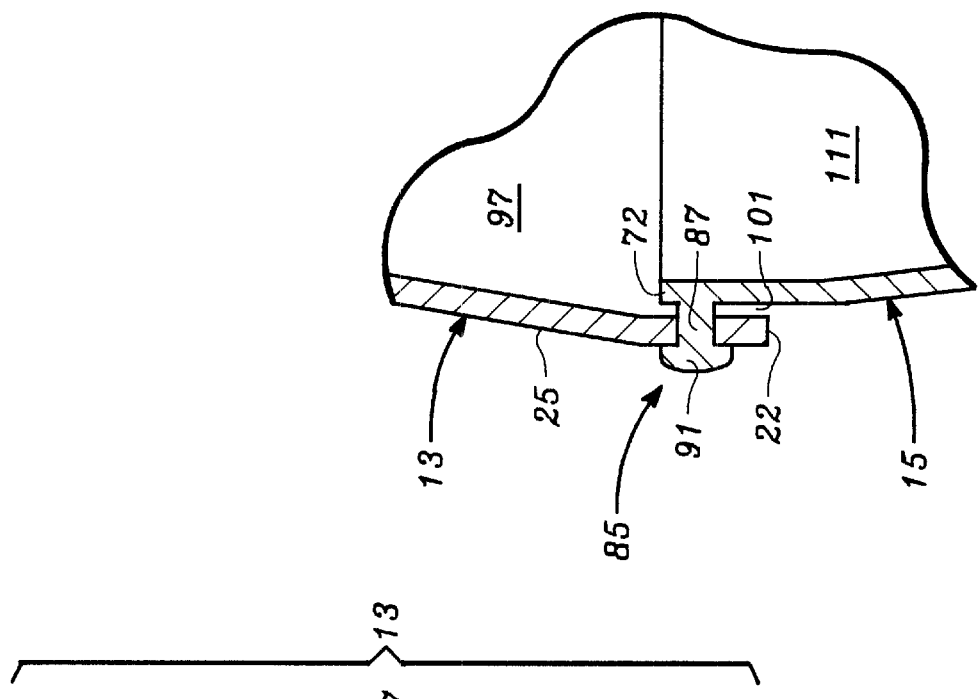

The description and operation of the insect trap of the invention will be best described with reference to FIG. 1. An insect trap 11 includes a first member 13, and a second member 15. The first member 13 has a first, closed end 17 and a second, open end 21 and terminates at an edge 22. The first member has a first cylindrical side portion 23, a frusto-conical portion 25, and a second cylindrical side portion 27 adjacent the second, open end 21. The first closed end 17 of the first member 13 has a lug 31 with a bore 33 for engagement of some other structure such as a wire or string, for suspending the insect trap 11. The first member 13 includes a plurality of offset finger projections 35 attached to first closed end 17 and extending into the first member. The finger projections can support a lure card structure therebetween, the illustration of which may be seen in forthcoming drawings. The first closed end 17 is formed with a top opening 37 and a boss 45 is fixed to the first closed end 17 proximate the perimeter of the top opening and extends upwardly from the first member. A plug 41 with a plurality of angularly displaceable finger projections 43 can be selectively inserted the opening. The finger projections are angularly biased so that they frictionally engage the boss when plug 41 is inserted therein. Spaces between the finger projections 43 define vent spaces, which may be exposed if the plug 41 is only partially inserted into top opening 37. A structure is attached to the first closed end 17 so that it extends downwardly from first closed end 17. The structure defines a frusto-conical chamber 47 in communication with top opening 37. A series of tapered slots 51 in the structure allow free communication between the frusto-conical chamber and compartment 97. The structure additionally has an aperture 53 located at its far end.

The first member 13 has a small, blind bore 55 inside its first end 17 for suspending a lure structure (not yet illustrated). The first member 13 has a plurality of locking bidirectional slots 57 adjacent its second open end 21. The locking bidirectional slots 57 have a first length 61 that extends away from the second open end 21 of the first member 13, a second length 63 that extends circumferentially along the second open end 21, and a third length 65 that extends toward the second open end 21.

The second member 15 has a second member toroidal end 67, and a second open end 71 and edge 72. The second member 15 is annular, with a bottom opening 73 (Shown in FIG. 3) on its second closed end 67 through which an insect may enter, and which communicates with a bore 75 with a terminal opening 77, an inner wall 81, and an outer wall 83. The second member 15 has a series of projections 85 with a body portion 87 and an expanded head portion 91, arranged circumferentially around the second open end 71 of the second member 15 proximate edge 72 and extending radially outward from reduced diameter portion 93, the body portion 87 engageable with the locking bidirectional slots 57 of the first member 13. Note that the presence of the third length 65 of the bidirectional locking slots 57 allows for either a suspension fit or an interference fit of the projections 85 with the bidirectional locking slots 57 at engagement. The spacious yet secure fit that results prevents stressing the material of which the insect trap 11 is constructed, and is likely to render the insect trap 11 useable for longer than would be expected with conventional insect traps. The set of projections 85 are adjacent a reduced diameter portion 93 of the, second member 15 at its second open end 71. The second member 15 also includes a set of tapered legs 95 radially positioned about its toroidal end 67.

Referring to FIG. 2, the first member 13 and second member 15 are illustrated as assembled, forming a compartment 97 between the first member 13 and the second member 15 for confining insects (not illustrated). FIG. 2 illustrates the relationship of the series of projections 85 of the second member 15 as engaged with the plurality of bidirectional locking slots 57. FIG. 2 illustrates that the edge 22 of the second open end 21 of the first member 13 extends past the edge 72 of the second open end 71 of the second member 15 in the insect trap 11 as assembled, thus creating a third opening 101, in communication with the compartment 97 and the surroundings of the insect trap 11, between the first member 13 and second member 15. In combination with the opening 37 in the first member 13 and the opening 73 in the second member 15, the third opening 101 allows free flow of air from the surroundings of the insect trap 11 through the compartment 97. In cases where the insect trap 11 may be exposed to heat or high humidity, a humidity or vapor barrier may form at the terminal opening 77 of the bore 75 where insects enter the insect trap 11. This barrier may discourage insects from entering the insect trap 11, and is therefore undesirable. Ventilation of the insect trap 11 creates a cooler atmosphere within the insect trap, which is advantageous since insects are more likely to enter the insect trap 11 than if there existed a humidity or vapor barrier. Another advantage to ventilating the insect trap 11 in hot conditions is that any vapor arising from a lure as a result of the heat will be deposited into the atmosphere surrounding the insect trap 11, and may therefore increase the probability of insect capture and confinement. With plug 41 removed, the frusto-conical chamber 47 becomes a second entry access for insects. Because of the length and shape of the frusto-conical chamber 47, an insect advancing into the frusto-conical chamber 47 any appreciable distance would have little chance of escaping, and subsequently would naturally advance toward and eventually through the aperture 53 in the frusto-conical chamber 47 and be confined. The tapered slots 51 in the frusto-conical chamber 47 also allow for the frusto-conical chamber 47 to be used as a lure support structure for lures that do not require solid containers. Note that the frusto-conical chamber 47 may be utilized for lure support both with and without the plug 41.

FIG. 3 is a cross-sectional view along line 3—3 of FIG. 2 of the insect trap 11 of the present invention. FIG. 3 is a more detailed view that shows the first member 13 as connected to the second member 15 by series of projections 85 engaged with plurality of bidirectional locking slots 57. FIG. 3 further illustrates the plug 41 with angularly displaceable finger projections 43 inserted into the opening 37 of the first member 13 and extending into the frusto-conical chamber 47 with tapered slots 51. Also illustrated in FIG. 3 is the lug 31 with bore 33 for suspending the insect trap. Concentrically aligned with the lug 31 is an annular projection 103 for lure support. The annular projection 103 has a circumferentially outwardly directed surface 105, and a blind bore 107, both for lure support. FIG. 3 illustrates the plurality of offset finger projections 35 of the first member 13, and the set of tapered legs 95 of the second member 15.

Finally, FIG. 3 illustrates a reservoir 111 formed by the outer wall 83 of the bore 75. FIG. 3 illustrates a liquid 113 contained in the reservoir 111, and which could be attractive, exterminator, or neutral in nature. Note that any of the aforementioned lure support structures, including the reservoir 111 may be used in conjunction with one another for the purposes of investigating which combination of lures may yield optimal results.

The opening 37 and frusto-conical chamber 47 of the insect trap 11 may be utilized as a vent both with or without the plug 41; however, when the plug 41 is engaged within the opening 37, it may be axially displaced either upwardly or downwardly to control the flow of air through the opening 37, and thus gives more control over ventilation than when the plug 41 is displaced completely. Note that the plug 41 may be displaced to allow full air flow, partial air flow, or no air flow. Alternatively, the plug 41 may be removed from the frusto-conical chamber 47, and the opening 37 may serve as an entry for insects.

FIG. 4 is an expanded view of the lug 31 with bore 33 of the insect trap 11 that is defined by line 4,5 in FIG. 3. FIG. 4 further illustrates a permeable cylindrical lure holder 115 that is frictionally engaged with the circumferentially outwardly directed surface 105 of the annular projection 103. The permeable cylindrical lure holder 115 is easily removeable and replaceable for inserting or replacing a lure therein.

FIG. 5 is an expanded view of the lug 31 with bore 33 of the insect trap 11 that is defined by line 4,5 in FIG. 3. FIG. 5 further illustrates a connector 117, which may be made of an elastomeric material and having a frictionally engageable nipple 121 shown disengaged with the blind bore 107 of the annular projection 103. The connector 117 has an open end 123 oppositely disposed from the frictionally engageable nipple 121 and which accommodates a lure holder (not illustrated).

Figure 6:
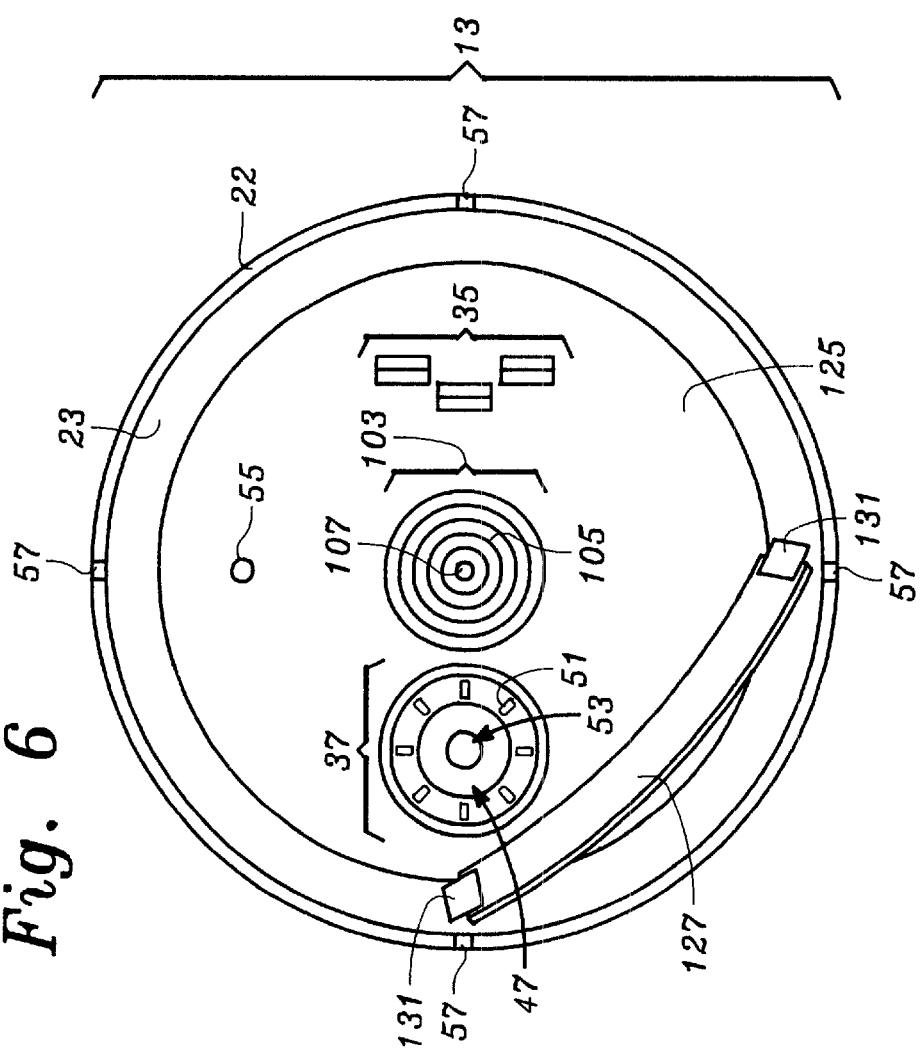
FIG. 6 is a top view of the insect trap seen in FIGS. 1–5 and illustrates a vent, lug, offset projections, lure card, tape, and bore; and, FIG. 7 is an enlarged cross-sectional view taken along line 7—7 in FIG. 3.

FIG. 6 is a view of the inside of the first member 13 of the insect trap 11, illustrating again the annular projection 103 and surrounding area, plurality of offset finger projections 35, frusto-conical chamber 47 with slots 51 and aperture 53, plurality of bidirectional locking slots 57, and small blind bore 55. Small blind bore 55 can also be used for engaging connector 117 so that two suspended lure containers can be accommodated. FIG. 6 further illustrates the inner surface 125 of the frusto-conical side portion 25 of the first member 13, and a lure card 127 secured thereon with adhesive tape 131. The lure card 127 can be a sticky lure card having adhesive, and thus can be adhered to the frusto-conical portion 25. Also, the lure card 127, whether it has a sticky surface or not, can be supported by the plurality of offset finger projections 35 extending inside the first end 17. The overall cylindrical shape of the insect trap 11 enables a user to view the contents of the insect trap 11 more easily. Additionally, if more than one lure structure is utilized, a user may more readily determine which lure is most effective since the contents may be viewed without their disturbance. Clear viewing into the insect trap 11 also permits a user to cleanly dispose of both the spent lure, with its lure structure and trapped insects without direct contact with either after viewing is completed.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An insect trap comprising:

a first member having a first member closed end that merges into a first cylindrical side portion terminating at a first member open end, and a top opening spaced apart from said first member open end;

a second member having a second member toroidal end that merges into a reduced diameter portion terminating at a second member open end and a bottom opening spaced apart from said second member open end, said first member attached to said second member adjacent said first member open end and said second member open end to form a compartment, having fluid communication between said compartment and the surroundings external to said trap through said top opening and said bottom opening;

said first cylindrical side portion and said reduced diameter portion establishing an annular gap therebetween, said annular gap placing said compartment in fluid communication with the surroundings;

a boss attached to said first member and extending therefrom, said boss defining said top opening; and, a plug having at least two spaced apart finger projections biased to frictionally engage said boss when inserted into said top opening and having a length to allow for selective partial placement of said plug in said top opening at predetermined positions along said finger projections.

2. The insect trap as recited in claim 1 and further comprising a structure attached to said first member and extending therefrom into said compartment opposite from said boss, said structure defining a frusto-conical chamber.

3. An insect trap comprising:

a first member having a first member closed end and a first member open end;

a second member having a second member toroidal end and a second member open end, said first member attached to said second member adjacent said first member open end and said second member open end to form a compartment;

said first member and said second member defining an annular gap therebetween; and, said first member supporting a plurality of internal attachment structures for removably supporting a lure support structure within said compartment;

said plurality including at least two flexible finger projections directed into said compartment and biased to simultaneously frictionally engage said lure support structure;

said plurality including a structure extending into said compartment for confining said lure support structure;

said plurality including a projection having a circumferentially outwardly directed surface frictionally engageable with said lure support structure;

said plurality including a blind bore in said first member, said blind bore frictionally engageable with said lure support structure;

said first member having a plurality of bidirectional locking slots adjacent said first member open end, said bi-directional locking slots extending in a first direction generally away from said first open end of said first member and thence in a second direction generally toward said first open end of said first member; and, said second member including a plurality of projections engageable with said bi-directional locking slots.

4. The insect trap as recited in claim 3 wherein each of said projections comprise a body portion and an expanded head portion.

5. The insect trap as recited in claim 3 wherein said second member further comprises a plurality of projections attached to said second member toroidal end and extending outwardly therefrom for elevating said second member from a surface.

* * * * *